(12) United States Patent
Yatomi

(10) Patent No.: US 7,751,691 B2
(45) Date of Patent: Jul. 6, 2010

(54) REPRODUCING APPARATUS

(75) Inventor: Toshiya Yatomi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 1192 days.

(21) Appl. No.: 11/037,738

(22) Filed: Jan. 18, 2005

(65) Prior Publication Data

US 2005/0180733 A1 Aug. 18, 2005

(30) Foreign Application Priority Data

Feb. 13, 2004 (JP) ............................. 2004-036813

(51) Int. Cl.
*H04N 7/26* (2006.01)
*H04N 5/91* (2006.01)
(52) U.S. Cl. ........................... 386/111; 386/68; 386/81; 386/82; 386/109; 386/110; 386/112; 386/124
(58) Field of Classification Search ................... 386/95, 386/116, 111–112, 68, 81, 82, 109, 110, 386/124
See application file for complete search history.

(56) References Cited

U.S. PATENT DOCUMENTS

| | | | | |
|---|---|---|---|---|
| 5,534,928 A | * | 7/1996 | Iwamura ................. | 375/240.13 |
| 5,602,956 A | * | 2/1997 | Suzuki et al. ................. | 386/68 |
| 6,516,034 B2 | | 2/2003 | Todo et al. | |
| 6,621,979 B1 | * | 9/2003 | Eerenberg et al. ............. | 386/68 |
| 6,683,987 B1 | * | 1/2004 | Sugahara ..................... | 382/235 |
| 6,879,581 B1 | * | 4/2005 | Leung ......................... | 370/352 |
| 7,023,926 B2 | | 4/2006 | Matsuura et al. | |
| 2003/0026590 A1 | | 2/2003 | Todo | |
| 2005/0105896 A1 | * | 5/2005 | Kochale ..................... | 386/111 |

FOREIGN PATENT DOCUMENTS

| | | |
|---|---|---|
| JP | 09-271025 A | 10/1997 |
| JP | 2000-032393 A | 1/2000 |
| JP | 2002-359603 A | 12/2002 |
| JP | 2003-018548 A | 1/2003 |

* cited by examiner

*Primary Examiner*—Thai Tran
*Assistant Examiner*—Daquan Zhao
(74) *Attorney, Agent, or Firm*—Canon U.S.A., Inc. I.P. Division

(57) ABSTRACT

A reproducing apparatus includes a reproducing unit that reproduces a video data sequence including video data of a plurality of pictures from a recording medium. The video data sequence is encoded by a coding method in which the amount of data per picture changes from one picture to another. The reproducing apparatus further includes an error correcting unit that corrects the reproduced video data sequence for an error, and a control unit that substitutes data of a picture including an error that is uncorrectable by the error correcting unit with predetermined encoded data so as to output the same image as a picture immediately previous to the picture including the uncorrectable error when the video data sequence is decoded.

6 Claims, 5 Drawing Sheets

REPRODUCING APPARATUS

BACKGROUND OF THE INVENTION

1. Field of the Invention

The present invention relates to a reproducing apparatus, and more specifically to processing of error data in encoded image data.

2. Description of the Related Art

An apparatus for encoding video data using an encoding technique, such as MPEG (moving picture expert group), and recording and reproducing the encoded data is disclosed in, for example, Japanese Patent Laid-Open No. 2003-46944 (corresponding U.S. Published Application No. 2003/26590). In this recording and reproducing apparatus, if reproduced encoded data is missing, the missing data is substituted with encoded data of a specific color, such as black or gray. However, this apparatus outputs a black or gray picture for missing data, and gives an undesirable image to the user. Moreover, if black or gray data is merely inserted in an encoded stream, the resulting stream is not verified with the buffer model (VBV (video buffering verifier) buffer) that is specified by MPEG, and a decoder may cause decoding failure due to underflow or overflow of data stored in a buffer memory.

SUMMARY OF THE INVENTION

In order to overcome the foregoing problems, the present invention provides a system for preventing decoding failure if missing data, such as an error, occurs in an encoded stream to give a desirable reproduced screen.

In an aspect of the present invention, a reproducing apparatus includes a reproducing unit that reproduces a video data sequence including video data of a plurality of pictures from a recording medium, the video data sequence being encoded by a coding method in which the amount of data per picture changes from one picture to another, an error correcting unit that corrects the video data sequence reproduced by the reproducing unit for an error, and a control unit that performs substitution on the video data sequence so that data of a picture including an error that is uncorrectable by the error correcting unit is substituted with predetermined encoded data so as to output the same image as a picture immediately previous to the picture including the uncorrectable error when the video data sequence is decoded.

Further features and advantages of the present invention will become apparent from the following description of exemplary embodiments with reference to the attached drawings.

DESCRIPTION OF THE EMBODIMENTS

Embodiments of the present invention will be described.

Figure 1:
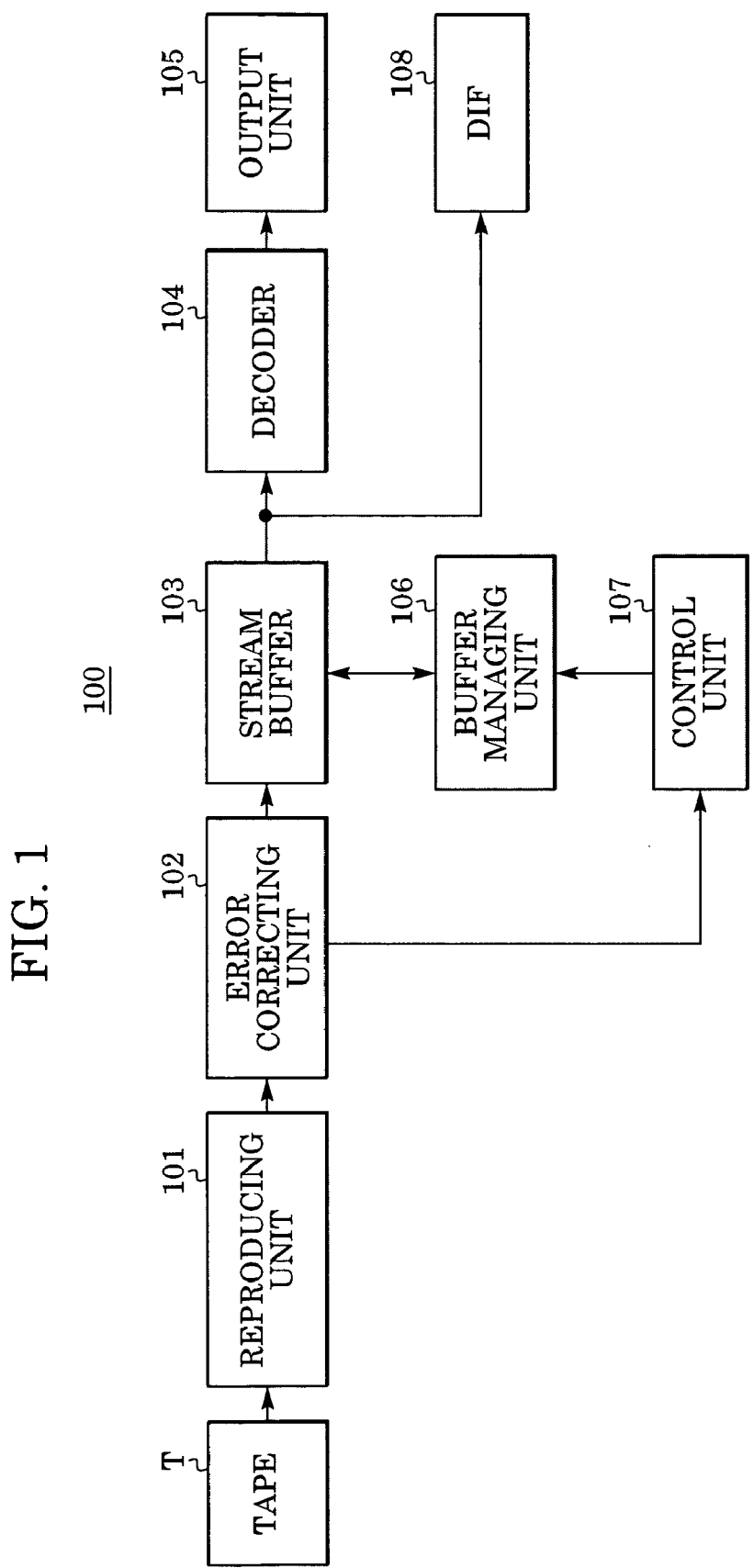
FIG. 1 is a block diagram of a reproducing apparatus according to the present invention.

FIG. 1 is a block diagram of a reproducing apparatus 100 according to the present invention.

The apparatus 100 shown in FIG. 1 reproduces an MPEG-encoded video stream from multiple tracks on a tape T. In MPEG, a data stream is encoded using the following three picture coding types frame-by-frame in predetermined order: I picture (intra-coded picture) coding using only image data within the same frame, P picture (predictive-coded picture) coding with motion compensation based on a preceding frame picture, and B picture (bi-directionally-predictive-coded picture) coding with motion compensation using the image data of the preceding and succeeding frames. In MPEG, a data stream is encoded in units of a predetermined number of frames starting from a given I picture to the next I picture, called a GOP (Group Of Pictures). I pictures are coded using only image data within the same frame. In P and B pictures, difference data from a reference frame is encoded, and the amount of encoded data changes from one frame to another.

In the present embodiment, image data is encoded and recorded so as to have substantially a predetermined data rate of several Mbps.

In FIG. 1, a reproducing unit 101 reproduces the recorded encoded image data, and outputs the reproduced image data to an error correcting unit 102. The error correcting unit 102 decodes the reproduced data according to error correction coding that the recorded image data is subjected to, and corrects for a transmission error in the reproduced data. If the reproduced data contains an uncorrectable error, the error correcting unit 102 informs a control unit 107 of the uncorrectable error.

Figure 2:
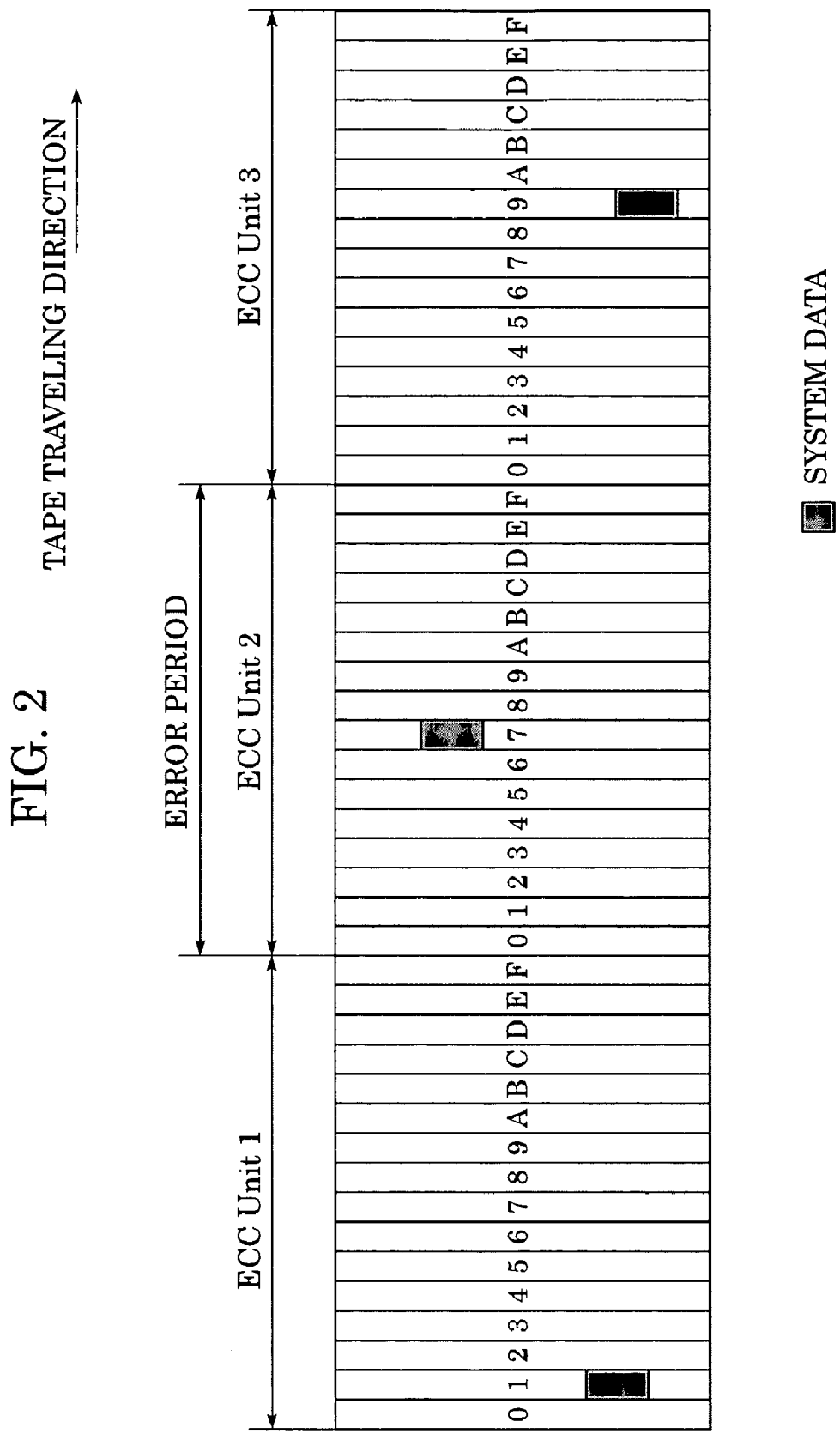
FIG. 2 is a diagram showing the track format of a tape.

FIG. 2 illustrates a format of the data recorded in the tape T.

As shown in FIG. 2, in the present embodiment, data is interleaved in units of 16 tracks, and the interleaved data is subjected to error correction coding to add an outer code. A unit of 16 tracks is referred to as an "ECC unit". The error correcting unit 102 performs error correction decoding in units of ECC units. In this case, an uncorrectable error can occur in units of ECC units, and correct reproduced data may be missing.

In the present embodiment, in addition to the MPEG-encoded image and audio data, system data is inserted every predetermined number of frames. The system data is data for editing the encoded image and audio data recorded in the tape T, and includes a DTS (decoding time stamp) and VBV_Delay value of the encoded data. In the present embodiment, a GOP consists of 15 frames in order of I, B, B, P, B, B, P, B, B, P, B, B, P, B, B pictures, and system data is inserted every 3 frames. In one GOP, therefore, system data is multiplexed before the I picture and the P pictures.

The DTS is a time stamp for synchronizing MPEG data when decoded. When the value of a decoder counter that counts a reference time coincides with the value of the DTS, MPEG data is actually decoded. In MPEG-2, the value of a counter that counts a 27-MHz system clock is used as a reference time.

The VBV_Delay value indicates the time for which encoded data of one frame resides in a VBV buffer that is specified by MPEG when decoded.

Figure 3:
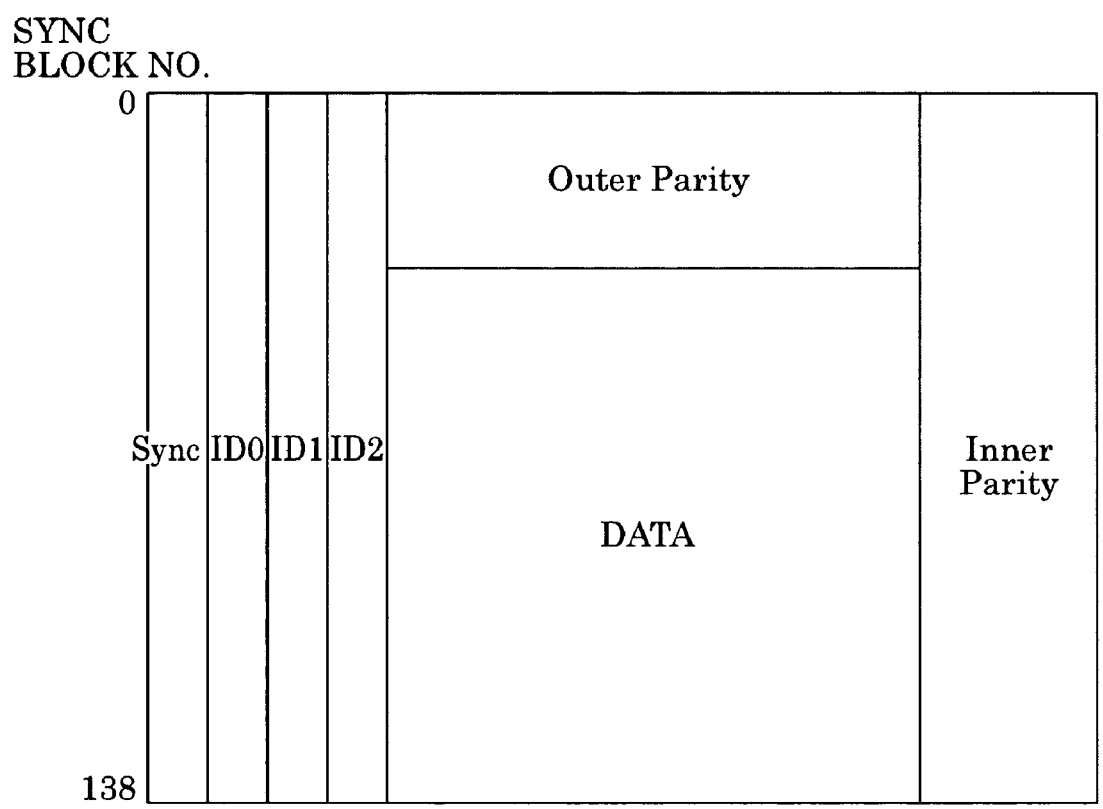
FIG. 3 is a diagram showing the format of data recorded in each track.

FIG. 3 illustrates the structure of data recorded in each track shown in FIG. 2.

As shown in FIG. 3, data recorded in one track consists of 139 sync blocks 0 to 138. Each sync block is constituted by Sync, ID0, ID1, ID2, encoded data or outer parity, and inner parity. ID0 to ID2 include track pair number information indicating the track position in one ECC block, and sync block number information of one track.

The outer parity shown in FIG. 3 is added by calculation to interleaved data of 16 tracks. The error correcting unit 102 performs error correction decoding in units of 16 tracks using the outer parity and the inner parity.

The data corrected by the error correcting unit 102 is written in a stream buffer 103. The stream buffer 103 has a storage capacity more than the amount of data specified by MPEG. A buffer managing unit 106 manages writing and reading of data to and from the stream buffer 103 and other processing under the control of a control unit 107.

The encoded data stored in the stream buffer 103 is sent to a decoder 104 at a timing determined based on the DTS, and is then decoded. The decoded image and audio data is output to an external monitor or the like from an output unit 105. The encoded data stored in the stream buffer 103 is also output to a digital interface (DIF) 108. The DIF 108 outputs the MPEG stream data output from the stream buffer 103 to an external decoder or the like via a transmission path according to a digital interface standard, such as IEEE 1394.

Processing of error data in reproduced data by the reproducing apparatus 100 will now be described. In the following description, encoded data is recorded in the manner shown in FIG. 2, and the data in the ECC unit 2 contains an uncorrectable error.

Figure 4:
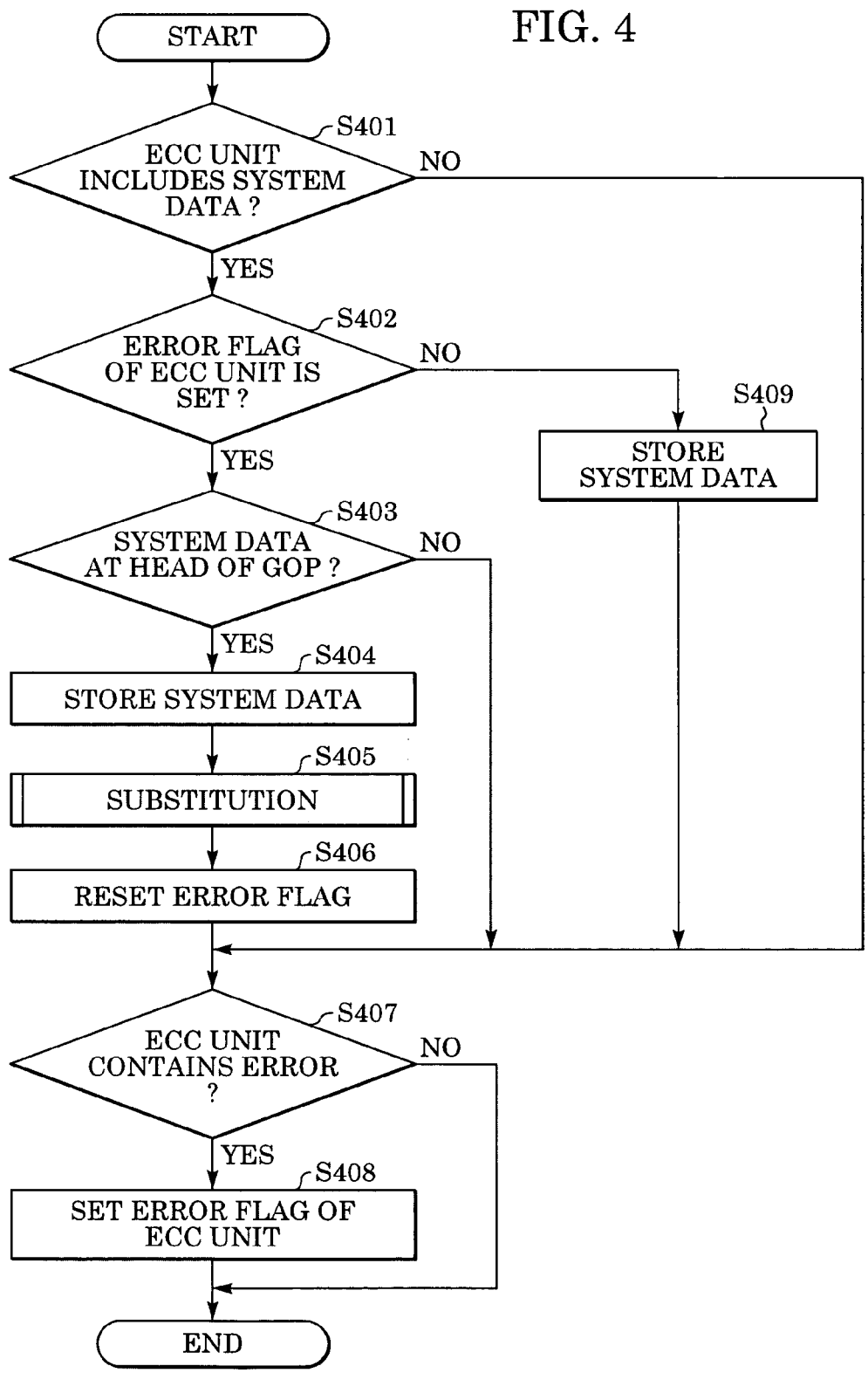
FIG. 4 is a flowchart showing a reproducing process.

FIG. 4 is a flowchart showing uncorrectable-error control performed by the control unit 107.

In FIG. 4, first, it is determined whether or not a reproduced ECC unit includes system data (step S401). In FIG. 2, each of the ECC units 1 to 3 includes system data. In the present embodiment, as described above, image data is encoded so that the amount of data changes depending upon the frame, and therefore system data is not always contained in an ECC unit.

If no error detection flag is output from the error correcting unit 102 and if an ECC unit reproduced by the buffer managing unit 106 includes system data, the control unit 107 determines whether or not an error flag indicating the presence of error data in any preceding reproduced ECC unit is set (step S402). If the error flag is not set, it is determined that no preceding ECC unit data containing an uncorrectable error exists or a substitution procedure described below has been performed, and the reproduced system data is stored in a system data backup memory of the buffer managing unit 106 (step S409).

The backup memory of the buffer managing unit 106 includes a first memory area for storing the system data detected immediately before an ECC unit containing an uncorrectable error, and a second memory area for storing the system data multiplexed at the head of the GOP reproduced immediately after an ECC unit containing an error. If it is determined in step S402 that the error flag is not set, the first memory area is overwritten each time system data is detected, and the detected system data is stored in the first memory area.

In FIG. 2, the ECC unit 1 contains no error, and includes system data. Thus, the system data in the ECC unit 1 is first stored in the first memory area. After the system data is stored in the first memory area (step S409), the process proceeds to step S407.

In step S407, it is determined whether or not the currently reproduced ECC unit contains an uncorrectable error. In FIG. 2, the ECC unit 1 contains no error. Thus, the process ends.

Data processing in the ECC unit 2 will now be described.

Since the ECC unit 2 contains an uncorrectable error, system data cannot be detected in step S401. Then, the process proceeds to step S407. In step S407, it is determined whether or not the ECC unit 2 contains an uncorrectable error. Since the ECC unit 2 contains an error, the process proceeds to step S408. In step S408, an internal error flag indicating that the reproduced ECC unit contains an error is set. Then, the process ends.

A process for reproducing the ECC unit 3 containing no error that follows the ECC unit 2 containing an error will now be described.

Since the ECC unit 3 contains no uncorrectable error, system data is detected in step S401. Then, an error flag is checked to determine whether or not any preceding ECC unit contains an error (step S402). In this example, the ECC unit 2 contains an uncorrectable error, and the error flag is set. Thus, the process proceeds to step S403. In step S403, it is determined whether or not the system data detected in step S401 is system data multiplexed at the head of a GOP in the MPEG stream. If it is system data multiplexed at the head of a GOP, the detected system data is stored in the second memory area of the buffer managing unit 106 (S404). In this example, it is assumed that the system data in the ECC unit 3 resides at the head of a GOP, and the system data in the ECC unit 3 is stored in the second memory area.

At this time, the system data in the ECC unit 1 is stored in the first memory area of the buffer managing unit 106, and the system data in the ECC unit 3 is stored in the second memory area. The system data stored in the first and second memory areas are used to perform a substitution procedure described below on the data in the ECC unit 2 containing an uncorrectable error and the preceding and succeeding data (step S405). In step S406, the error flag is reset, and the process proceeds to step S407. It is determined in step S407 that the ECC unit 3 contains no uncorrectable error, and then the process ends.

Figure 5:
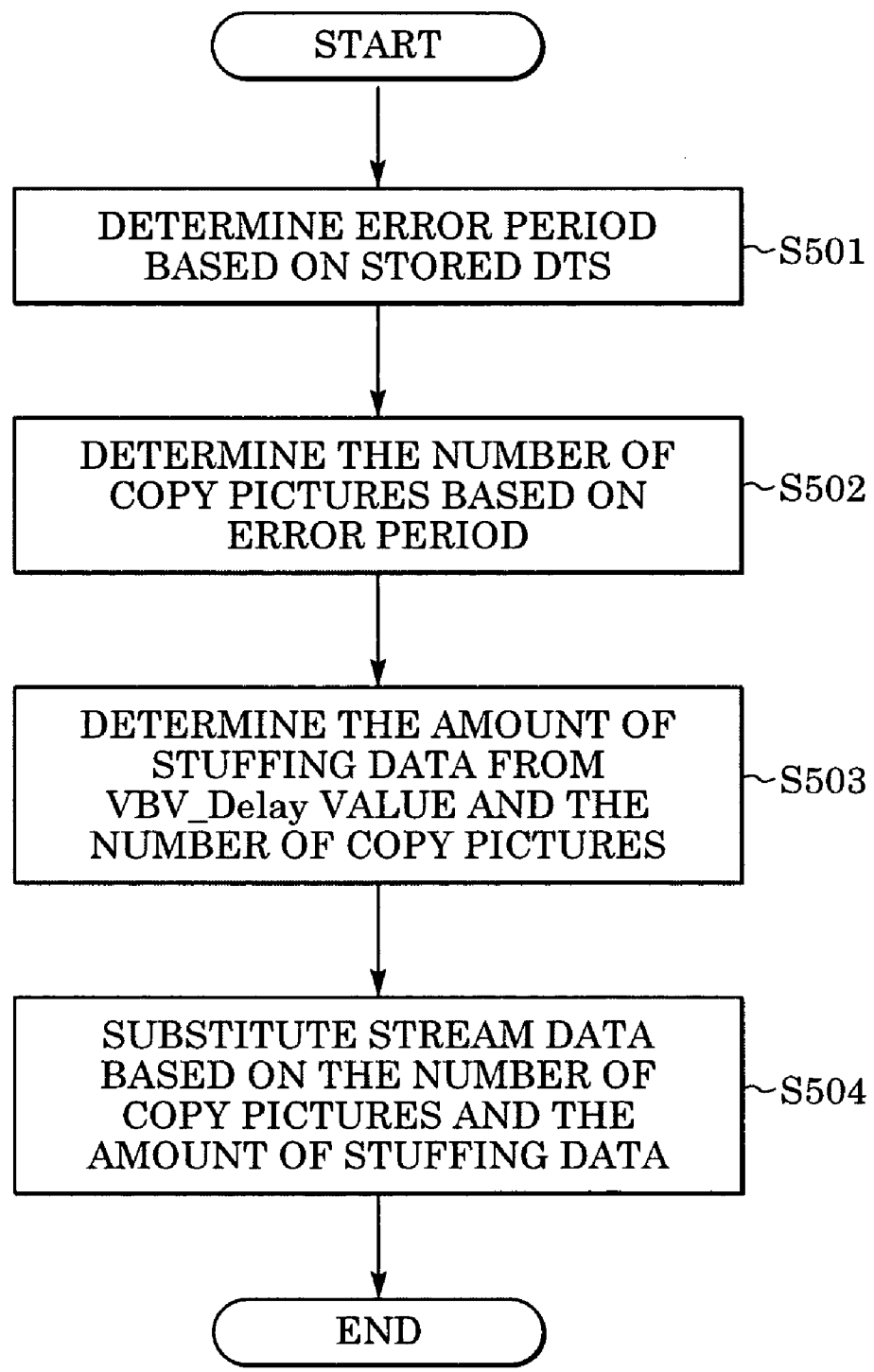
FIG. 5 is a flowchart showing an error data substitution process.

FIG. 5 is a flowchart showing the substitution procedure in step S405 shown in FIG. 4.

In the present embodiment, as described above, the system data detected immediately before an ECC unit containing an uncorrectable error and the system data at the head of the GOP detected immediately after the ECC unit are backed up. The difference between the values of the DTSs in these system data is determined (step S501), and a series of frames between these system data, including the ECC unit containing the error, is detected (step S502).

The number of frames between the system data detected immediately before and after the ECC unit containing the error is given as follows:

number of frames=(difference between DTSs in the system data before and after the error/(clock speed))×frames per second For example, in the case where the system has a 27 MHz system clock and data having 30 frames per second (fps), the above equation is as follows:

number of frames=(difference between DTSs in the system data before and after the error/($27 \times 10^6$))× 30

In the present embodiment, the buffer managing unit 106 uses data indicating that the difference between the current data and data immediately previous to the current data is 0 in an MPEG system (hereinafter referred to as "Copy-Picture data"). The MPEG stream data stored in the stream buffer 103 that resides between the system data in the ECC unit 1 and the system data in the ECC unit 3 is substituted with the Copy-Picture data corresponding to the number of frames given in the above-noted equation. When the Copy-Picture data is input to the decoder 104, the decoder 104 outputs the decoded image data of the reference frame. The reproduced image of the Copy-Picture data is therefore the same as the image of the reference frame.

The Copy-Picture data is MPEG data indicating zero difference, and has a small amount of data. Thus, insertion of the Copy-Picture data can cause an underflow of the VBV buffer.

In order to avoid such an underflow problem, the amount of data for the error period is determined, and stuffing data (or dummy data) is generated by subtracting the amount of Copy-Picture data from the determined amount of data. The generated stuffing data is put in place of the MPEG data for the error period stored in the stream buffer 103 (steps S503 and S504).

The amount of stuffing data is determined as follows:

amount of stuffing data=(difference between the DTSs/(clock speed) +(VBV_Delay value of the system data before the error–VBV_Delay value of the system data after the error))×recording rate–the amount of Copy-Picture data The period between the system data before and after an ECC unit containing an uncorrectable error is regarded as an error period. The data corresponding to the error period is substituted with the Copy-Picture data, and the stuffing data is further inserted to prevent the VBV buffer specified by MPEG from causing an overflow before and after the Copy-Picture data. Thus, if an uncorrectable error occurs, the reproduced image for the error period can be displayed by freezing the preceding image on the screen.

The error data in the MPEG stream is substituted with the Copy-Picture data, thus allowing even an external decoder to show a screen on which the preceding image is frozen during the error period when the MPEG stream is output from the DIF 108, which gives a better viewing screen to the user.

In FIG. 2, the ECC unit 3 that follows the error period includes P picture data and B picture data, and the ECC unit 2 containing an error may include a reference picture data of the P picture data and the B picture data.

In the present embodiment, all data from the system data reproduced after an ECC unit containing an uncorrectable error to the system data multiplexed at the head of a GOP is substituted with the Copy-Picture data. This prevents the ECC unit data reproduced after an ECC unit containing an error from being incorrectly decoded. In MPEG data, as described above, an I picture resides at the head of a GOP. Thus, the data from the head of the GOP can be correctly decoded.

In the present embodiment, system data is multiplexed before the I picture and P pictures in one GOP. However, the present invention is not limited thereto, and system data may be multiplexed before the I picture that resides at the head of a GOP.

In this case, the data of the GOP including image data of an ECC unit containing an uncorrectable error is substituted with the Copy-Picture data, and the number of pictures of the Copy-Picture data is equal to the number of pictures of one GOP.

In the illustrated embodiment, the present invention is applied to an apparatus that reproduces an MPEG stream recorded on a tape. The present invention may also be applicable to reproduction of data encoded using a coding technique in which the amount of data changes depending upon the frame, such as MPEG.

According to the present embodiment, therefore, a picture including error data is substituted with encoded data so as to output the same image as a picture immediately before the picture, thus giving a better reproduced picture when decoded.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-036813 filed Feb. 13, 2004, which is hereby incorporated by reference herein.

What is claimed is:

1. A reproducing apparatus comprising:
    a reproducing unit configured to reproduce, from a recording medium, encoded video data of a plurality of pictures encoded by using an intra-picture encoding for encoding video data using the video data within the same picture and an inter-picture encoding for encoding difference data from a reference picture, the encoded video data including an intra-picture encoded picture every n pictures;
    an error correcting unit configured to correct an error in the encoded video data reproduced by the reproducing unit;
    a detecting unit configured to detect a picture including an error that is uncorrectable by the error correcting unit in the encoded video data reproduced by the reproducing unit; and
    a controller, responsive to a detection result of the detecting unit, configured to substitute the encoded video data of each of the plurality of inter-picture encoded pictures from the picture including the uncorrectable error detected by the detecting unit to a next intra-picture encoded picture in the encoded video data with predetermined encoded data indicating that difference data from the reference picture is zero, and to output the encoded video data including the substituted predetermined encoded data to a decoder which decodes the encoded video data.

2. A reproducing apparatus according to claim 1, wherein the encoded video data includes a predictive-encoded picture encoded by the inter-picture encoding using a preceding picture as a reference picture and a bi-directionally-predictive-encoded picture encoded by the inter-picture encoding using preceding and succeeding pictures as reference pictures, and
    the controller is configured to substitute the encoded video data of each of a plurality of pictures from the predictive-encoded picture immediately previous the picture detected by the detecting unit to the next intra-picture encoded picture in the encoded video data with the predetermined encoded data.

3. A reproducing apparatus according to claim 2, wherein time stamp information for use in decoding the encoded video data is added to the intra-picture encoded picture and the predictive-encoded picture of the encoded video data, and the controller is configured to determine the number of pictures to be substituted with the predetermined encoded data based on the time stamp information added to the predictive-encoded picture immediately previous the picture detected by the detecting unit and the time stamp information added to the next intra-picture encoded picture.

4. A reproducing apparatus according to claim 3, wherein the controller substitutes the encoded video data of the determined number of pictures from the predictive-encoded picture immediately previous the picture detected by the detecting unit to the next intra-picture encoded picture in the encoded video data with the predetermined encoded data of the determined number of pictures and dummy data corresponding to the difference between the amount of the encoded video data from the predictive-encoded picture immediately previous the picture detected by the detecting unit to the next intra-picture encoded picture and the amount of the predetermined encoded data of the determined number of pictures.

5. A reproducing apparatus according to claim 1, further comprising an external outputting unit configured to receive the encoded video data including the substituted predetermined encoded data from the controller and to output the encoded video data including the substituted predetermined encoded data to outside of the reproducing apparatus.

6. A reproducing apparatus according to claim 1, wherein the encoded video data includes a plurality of groups of pictures each having n pictures including the intra-picture encoded picture and the inter-picture encoded picture, and the controller substitutes all encoded video data of the plurality of pictures from the picture detected by the detecting unit to a next group of pictures with the predetermined encoded data.

* * * * *